United States Patent [19]

Mitsuhashi et al.

[11] Patent Number: 4,723,180
[45] Date of Patent: Feb. 2, 1988

[54] INTERMITTENT DRIVE TYPE MAGNETIC RECORDING APPARATUS

[75] Inventors: Yasuo Mitsuhashi; Takafumi Inadomi, both of Nagaokakyo, Japan

[73] Assignee: Mitsubishi Denki Kabushiki Kaisha, Tokyo, Japan

[21] Appl. No.: 834,555

[22] Filed: Feb. 19, 1986

[30] Foreign Application Priority Data

Feb. 26, 1985 [JP] Japan .................................. 60-39602

[51] Int. Cl.$^4$ .......................... G11B 5/09; G11B 15/48
[52] U.S. Cl. ...................................... 360/52; 360/74.1
[58] Field of Search ..................... 360/52, 72.3, 74.2; 242/186, 191, 208, 203

[56] References Cited

U.S. PATENT DOCUMENTS 4,531,166  7/1985  Anderson ........................... 360/74.2
4,607,294  8/1986  Nishitani ............................. 360/723

Primary Examiner—Vincent P. Canney
Attorney, Agent, or Firm—Lowe, Price, LeBlanc, Becker & Shur

[57] ABSTRACT

A motor drive amount correction signal generating circuit (14) corrects a deviation of an intermittent feed amount of a magnetic tape (1) by using reverse rotation pulse groups ($t_1$, $t_2$, $t_3$, etc.) or forward rotation pulse groups ($t_1'$, $t_2'$, $t_3'$, etc.) and if the deviation is beyond a permissible range, the level of the braking voltage generated from a motor drive circuit (7) is changed in the subsequent drive period in intermittent recording.

10 Claims, 9 Drawing Figures

INTERMITTENT DRIVE TYPE MAGNETIC RECORDING APPARATUS

BACKGROUND OF THE INVENTION

1. Field of the invention

The present invention relates to an intermittent drive type magnetic recording apparatus and particularly to an intermittent drive type magnetic recording apparatus capable of automatically adjusting the brake torque of a running system of a magnetic recording medium according to load change.

2. Description of the Prior Art

FIG. 1 is a block diagram of an example of an intermittent drive control portion in a conventional intermittent drive type magnetic recording apparatus. A magnetic tape 1 is held between a capstan shaft 2 and a pinch roller 3 so that it is moved at a certain speed by the rotation of the capstan shaft 2. On the other hand, a feed amount setting circuit 4 is adapted to set an intermittent feed amount of the magnetic tape 1, so that a feed amount setting signal is generated therefrom. The feed amount setting signal is provided as a signal including a prescribed number of pulses (10 pulses, for example) representing a power running period and a prescribed number of pulses (6 pulses, for example) representing a braking period. The feed amount setting signal is supplied to an intermittent drive signal generating circuit 5 and to one input of an error detector 6. Based on the feed amount setting signal, the intermittent drive signal generating circuit 5 generates sequentially a run command signal and a brake command signal for intermittently running the magnetic tape 1. The output of the intermittent drive signal generating circuit 5 is supplied to a motor drive circuit 7. The motor circuit 7 comprises an amplifier, etc., and generates sequentially a driving voltage and a braking voltage based on the command signals from the intermittent drive signal generating circuit 5. An output of the motor drive circuit 7 is applied to a capstan motor 8. The capstan motor 8 has a rotating shaft connected to a pulley 10 through a belt 9. The pulley 10 is fixed to the outer circumference of the capstan shaft 2.

In addition, an angle sensor 11 is fixed to the capstan shaft 2. The angle sensor 11 generates an angle signal corresponding to the rotating angle (the rotating distance) of the capstan shaft 2. As the angle sensor 11, the technique described in Japanese Patent Laid-Open Gazette No. 122909/1984, for example, may be adopted. Briefly stated, the angle sensor described in this gazette comprises a fly wheel 111 attached to the capstan shaft 2 as shown in FIG. 2. Along the outer circumference of the fly wheel 111, a plurality of notches 112 each having a fixed width are provided at equal intervals. On the other hand, over the circumferential portion of the fly wheel 111, light emitting elements 113, 114 and 115 are disposed so that they are in a phase relation with the notches 112 in which they deviate from one another by ⅓ of the width of each notch 112. Under the circumferential portion of the fly wheel 111, light receiving elements 116, 117 and 118 are disposed opposite the light emitting elements 113, 114 and 115. When fly wheel 111 rotates, three angle signals (pulse signals) $C_1$, $C_2$ and $C_3$ are obtained from the light receiving elements 116, 117 and 118, the faces thereof being deviated by ⅓ of each face as shown by (a) to (c) in FIG. 3, respectively. The three angle signals $C_1$, $C_2$ and $C_3$ thus obtained undergo logical operation, whereby the angle range corresponding to a cycle T shown in FIG. 3 can be detected by dividing the angle range into six regions I VI. Thus, detection of a rotational face can be detected with high precision.

The three angle signals $C_1$, $C_2$ and $C_3$ provided from the angle sensor 11 are supplied to a position detector 12. The position detector 12 comprises a matrix circuit for applying logical operation to the output of the angle sensor 11. The position detector 12 detects a moving amount of the magnetic tape 1 and provides a position signal. The position signal is provided as a pulse signal having pulses the number of which correspond to the moving amount of the magnetic tape 1. The output of the position detector 12 is supplied to the other input of the error detector 6. The error detector 6 comprises a counter and a comparator, etc., and detects an error as a difference between the feed amount setting signal from the feed amount setting circuit 4 and the position signal from the position detector 12 (which indicates the signal having the larger number of pulses and the difference between the numbers of pulses of the two signals), so that an error signal is generated. The error signal is supplied to the motor drive circuit 7 as a correction signal.

In addition, the capstan shaft 2 comprises a brake 13 for braking capstan shaft 2. Brake 13 may be a mechanical brake with a felt pad attached thereto.

FIG. 4 is a waveform diagram for explaining the operation of the conventional example shown in FIG. 1. FIG. 4(a) represents the output voltage of the motor drive circuit 7, namely, the voltage applied to the capstan motor 8; FIG. 4(b) represents the running speed of the magnetic tape 1; FIG. 4(c) represents the angle signals provided from the angle sensor 11; and FIG. 4(d) represents the position signal obtained from the position detector 11. In addition, FIG. 4(e) represents pulses generated from a rotational drum pulse generator (not shown) (generally called FF pulses, which serve as reference pulses for adjusting the face of the rotational drum); FIG. 4(f) represents a video head writing pulse; and FIG. 4(e) represents an FM video signal written in the magnetic tape 1. In the following, the operation of the above described conventional apparatus will be described, referring to FIG. 4.

First, this apparatus controls intermittent drive operation based on the feed amount setting signal provided from the feed amount setting circuit 4. More specifically, from the feed amount setting circuit 4, 16 pulses for example are generated, the first to the tenth pulses commanding a power running operation and the eleventh to the sixteenth pulses commanding a braking operation. The intermittent drive signal generating circuit 5 makes the motor drive circuit 7 generate a positive drive voltage as shown in FIG. 4(a) in a period corresponding to the first to tenth pulses of the feed amount setting signal so that the positive drive voltage is applied to the capstan motor 8. In consequence, the capstan motor 8 rotates in the forward direction. The rotation of the capstan motor 8 is transmitted to the pulley 10 through the belt 9 to rotate the capstan shaft 2 in the forward direction. As a result, the magnetic tape 1 moves by the pressing operation of the pinch roller 3. The running speed of the magnetic tape 1 increases gradually as shown in FIG. 4(b).

In this case, the write timing $t_0$ is determined at a position shown by an arrow in FIG. 4(e) based on the FF pulses shown in FIG. 4(e) and the video head writing pulse shown in FIG. 4(f). In one frame period (1/30 sec) after this timing $t_0$, the FM video signal is really written by the video head.

Subsequently, when the intermittent drive signal generating circuit 5 detects the tenth pulse of the feed amount setting signal, a negative drive voltage is generated from the motor drive circuit 7 and applied to the capstan motor 8. The rotation of the capstan motor 8 is electrically braked by the application of the negative drive voltage. Consequently, the running speed of the magnetic tape 1 gradually decreases as shown in FIG. 4(b). At this time, mechanical braking by the brake 13 is also applied. By this mechanical braking, the capstan shaft 2 can be rapidly braked with reverse rotation after braking prevented.

On the other hand, when the capstan shaft 2 rotates, three angle signals $C_1$, $C_2$ and $C_3$ as shown in FIG. 4(c) are provided from the angle sensor 11. These angle signals are supplied to the position detector 12 so that they are converted to a position signal indicating the position of the magnetic tape 1. More specifically, the position detector 12 provides a pulse signal as shown in FIG. 4(d), the number of pulses of this pulse signal indicating the moving amount of the capstan shaft 2, that is, the position of the magnetic tape 1. The position detector 12 is structured so as to generate pulses equal to the number of pulses of the feed amount setting signal from the feed amount setting circuit 4, that is, 16 pulses, in case where intermittent drive operation is performed in an ideal manner.

Thus, intermittent recording of an FM video signal for one frame is completed. This intermittent recording is repeated at intervals of several seconds for example. At the time of recording, an FM video signal of each frame is recorded at a position adjacent the FM video signal of the immediately preceding frame and in appearance, signals of the respective frames are continuously recorded on the magnetic tape 1 (see FIG. 6). More specifically, after recording one frame, the magnetic tape 1 is stopped for several seconds and then the magnetic tape 1 is made to run again to record the subsequent frame. Thus, intermittent drive is controlled so that a blank or an overlap may not be generated between the adjacent frames. For this purpose, the feed amount setting circuit 4 sets a power running period and a braking period for intermittent drive to specified values.

However, the rotating angle of the capstan shaft 2 is generally not precisely coincident with the set value because of the moment of inertia of the capstan system. For example, if the rotation of the capstan shaft 2 is too slow, the position signal from the position detector 12 unavoidably contains 17 or more pulses. If the subsequent frame is written in this state, a blank is generated between this frame and the preceding frame.

To prevent this phenomenon, the error detector 6 compares the feed amount setting signal from the feed amount setting circuit 4 and the position signal from the position detector 12 and determines whether the position signal contains exactly 16 pulses. If the number of pulses of the position signal is other than 16, the error detector 6 applies a correction voltage as shown by the solid line 20 or the dotted line 21 in FIG. 4(a) to the capstan motor 8 through the motor drive circuit 7. More specifically, if the number of pulses of the position signal is larger than 16, a negative voltage (a reverse voltage) as shown by the solid line 20 is applied to the capstan motor 8 and if the number of pulses is smaller than 16, a positive voltage (a forward voltage) as shown by the dotted line 21 is applied thereto. As a result, the capstan motor 8 is made to rotate in the reverse direction or in the forward direction so that correction is made. (In this case, the moving amount is extremely small.)

In the above described conventional apparatus, intermittent operation can be performed correctly only in the initial state (at the time of delivery of the product from a factory). In other words, such an apparatus is delivered in a state in which the correction voltage has been adjusted so that recording can be made continuously without causing a blank or an overlap between the adjacent frames.

However, in a VTR for intermittent recording or reproducing, a brake 13 is necessarily needed for applying rapid braking to the capstan shaft 2. The brake 13 comprises generally a felt pad pressed against the outer surface of a fly wheel as described above. As a result, the braking force of the brake 13 is changed due to gradual pad abrasion. If the braking force of the brake 13 is changed, the magnetic tape 1 is not stopped at a desired position and a position error increases. According to the increase of the position error, the correction amount of the correction voltage 20 or 21 is increased, causing problems as follows.

(1) A long period of time is required for correction and it happens that correction can not be made within one operation period in intermittent drive. In such a case, an overlap or a blank is generated between the adjacent frames.

(2) The amount of the magnetic tape 1 moved backward or forward by correction causes a slack in the magnetic tape 1 and as a result, operation of the VTR is unstable.

As described above, in the case of a conventional apparatus, satisfactory performance cannot be maintained over a long time although a satisfactory performance can be exhibited at the time of delivery of the apparatus. Particularly in the case of a long-period VTR mainly used for monitoring, the VTR is usually operated only in a recording mode for several months and it will hardly be operated in a reproduction mode unless it is necessary to reproduce the recorded scenes when an accident or the like occurs. Therefore, long-term reliability in performance is critical and it is desired to solve the above described problems.

SUMMARY OF THE INVENTION

It is an object of the present invention to provide an intermittent drive type magnetic recording apparatus capable of reliably performing intermittent recording for a long period if a change of load is caused in the running system of a magnetic recording medium.

Briefly stated, the present invention is adapted such that the brake torque of intermittent running means is changed based on an error detected by comparison between the intermittent feed amount of a magnetic recording medium preset by feed amount setting means and the real feed amount of the magnetic recording medium detected by feed amount detecting means.

According to the present invention, since the brake torque of the intermittent running means is changed based on an error detected by comparison between the preset feed amount in intermittent drive and the real feed amount, a position error of the magnetic recording medium can always be maintained at a small value. As a result, the error can be corrected in a short period and the correction of the error can be completed stably in one drive period in intermittent recording. Accordingly, an overlap or a blank between the adjacent frames can be prevented. In addition, little slack is caused in the magnetic recording medium by the correction of the error and, therefore, unstable operation will never occur. Thus, the apparatus of the present invention can perform intermittent recording stably for a long period.

These objects and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
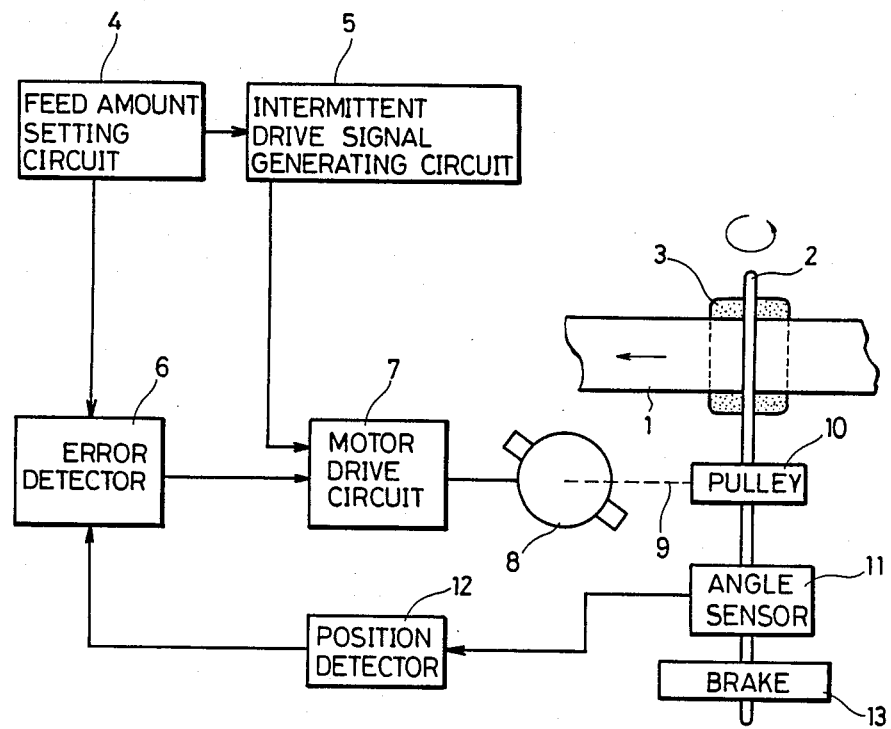
FIG. 1 rs a block diagram showing an example of an intermittent drive control portion in a conventional intermittent drive. type magnetic recording apparatus.
Figure 2:
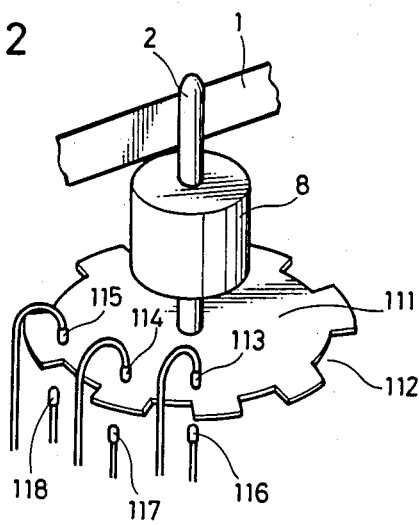
FIG. 2 is a perspective view showing an example of the angle sensor shown in FIG. 1.
Figure 3:
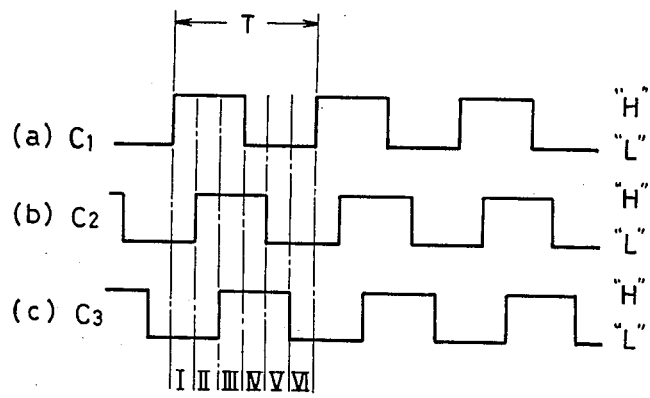
FIG. 3(a) through (c) is a timing chart showing angle signals obtained from the angle sensor shown in FIG. 2.
Figure 6:
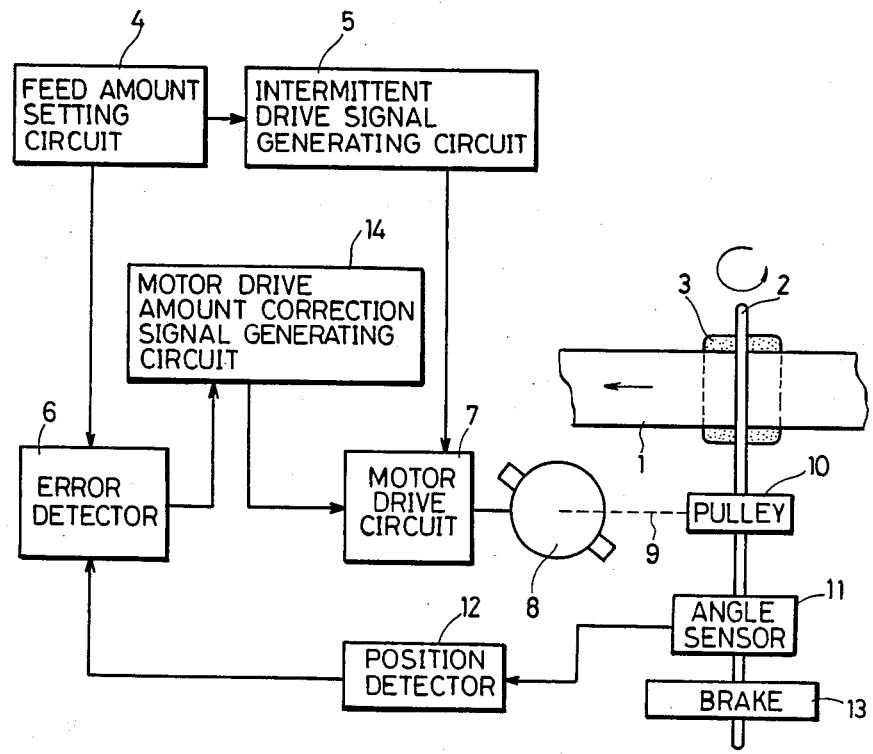
FIG. 6 is a schematic block diagram showing an embodiment of the present invention.

FIG. 6 is a schematic block diagram showing an embodiment of the present invention. A feature of this embodiment resides in that a motor drive amount correction signal generating circuit 14 is further provided to increase the reliability in intermittent recording operation, as compared with the conventional apparatus shown in FIG. 1. More specifically, a motor drive amount correction signal generating circuit 14 is connected between an error detector 6 and a motor drive circuit 7. The construction of other portions of the embodiment are the same as in the conventional apparatus shown in FIG. 1. Therefore, the portions corresponding to those shown in FIG. 1 are denoted by the same reference numerals and description thereof will be omitted.

The above described motor drive amount correction signal generating circuit 14 corrects the error according to an error signal generated from the error detector 6 (i.e., it causes capstan motor 8 to rotate in the forward or the reverse direction) and changes the brake torque of the capstan motor 8 if the error amount is large so that the error may always be within a permissible range. As a result, deviation in the timing for recording or a slack of the magnetic tape 1 due to a change in load can be prevented and intermittent operation can be performed stably for a long period. In this embodiment, the motor drive amount correction signal generating circuit 14 functions by providing forward rotation pulses and reverse rotation pulses by successively changing the polarity of the pulses, the number of pulses and a pulse amplitude value according to the error signal from the error detector 6 and a function of changing the braking voltage generated by the motor drive circuit 7.

Figure 7:
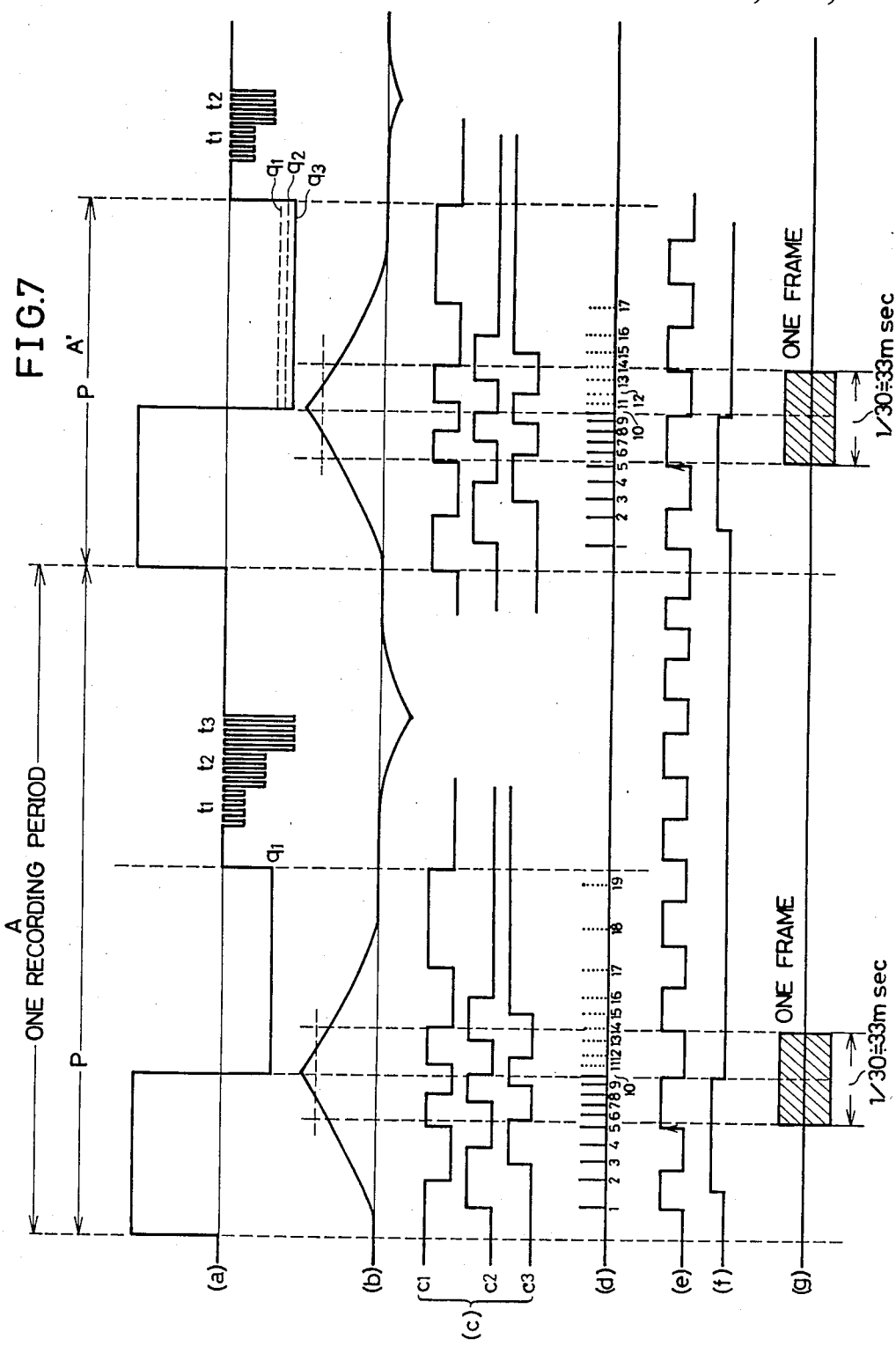
FIGS. 7(a) through (g) and 8(a) through (g) are waveform diagrams for explaining the operation of the embodiment shown in FIG. 6.
Figure 8:
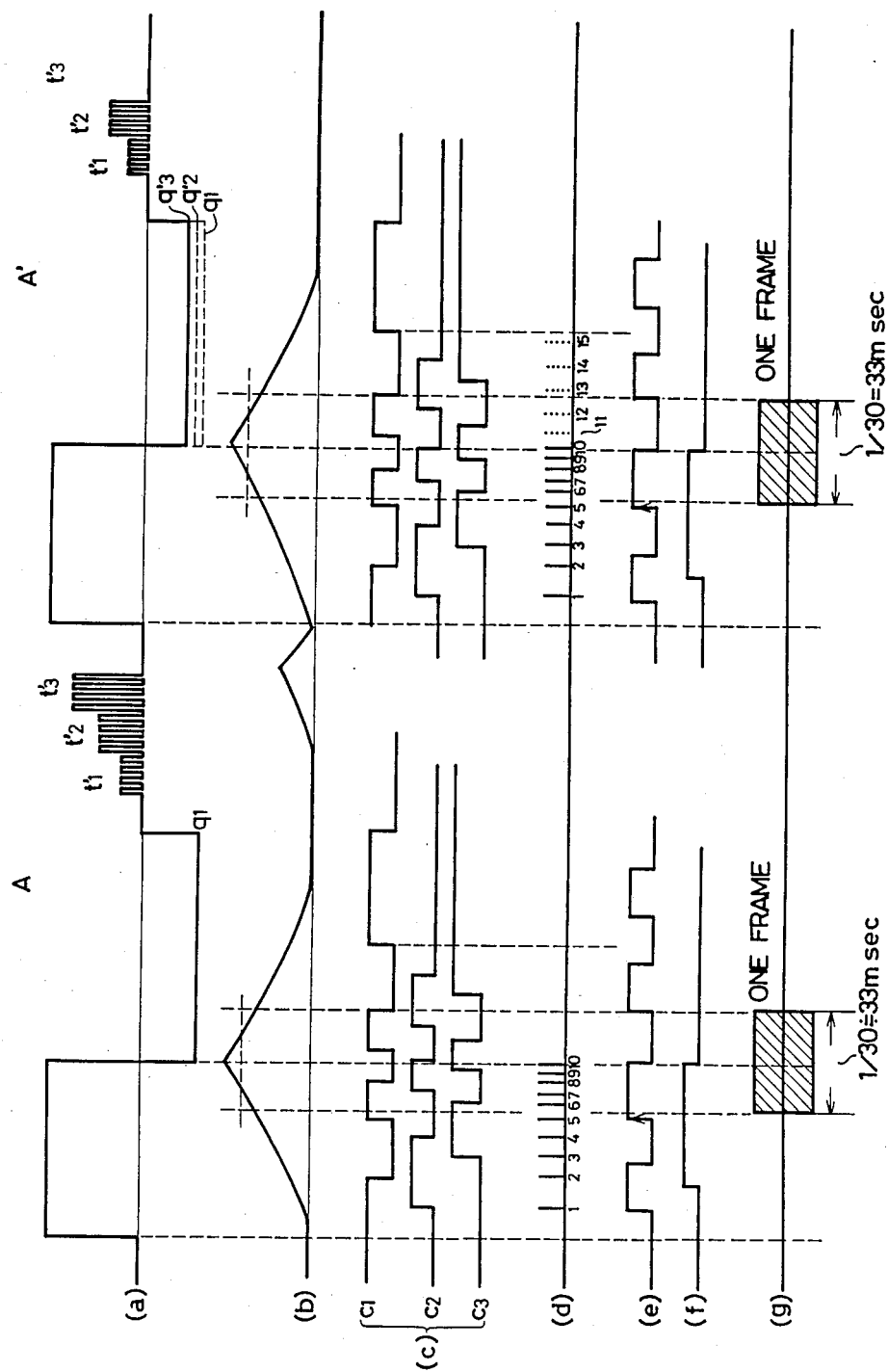

FIGS. 7 and 8 are waveform diagrams for explaining the operation of the embodiment shown in FIG. 6. FIG. 7 shows the operation in the case in which the load of the capstan shaft 2 is decreased, for example, in the case in which the brake 13 works loosely. FIG. 8 shows the operation in the case in which the load of the capstan shaft 2 is increased, for example, the case in which the brake 13 works tightly. In the following, referring to FIGS. 7 and 8, the operation of the embodiment shown in FIG. 6 will be described. FIGS. 7(a) to 7(g) and FIGS. 8(a) to 8(g) show the waveforms of the same signals as in FIGS. 4(a) to 4(g).

Figure 4:
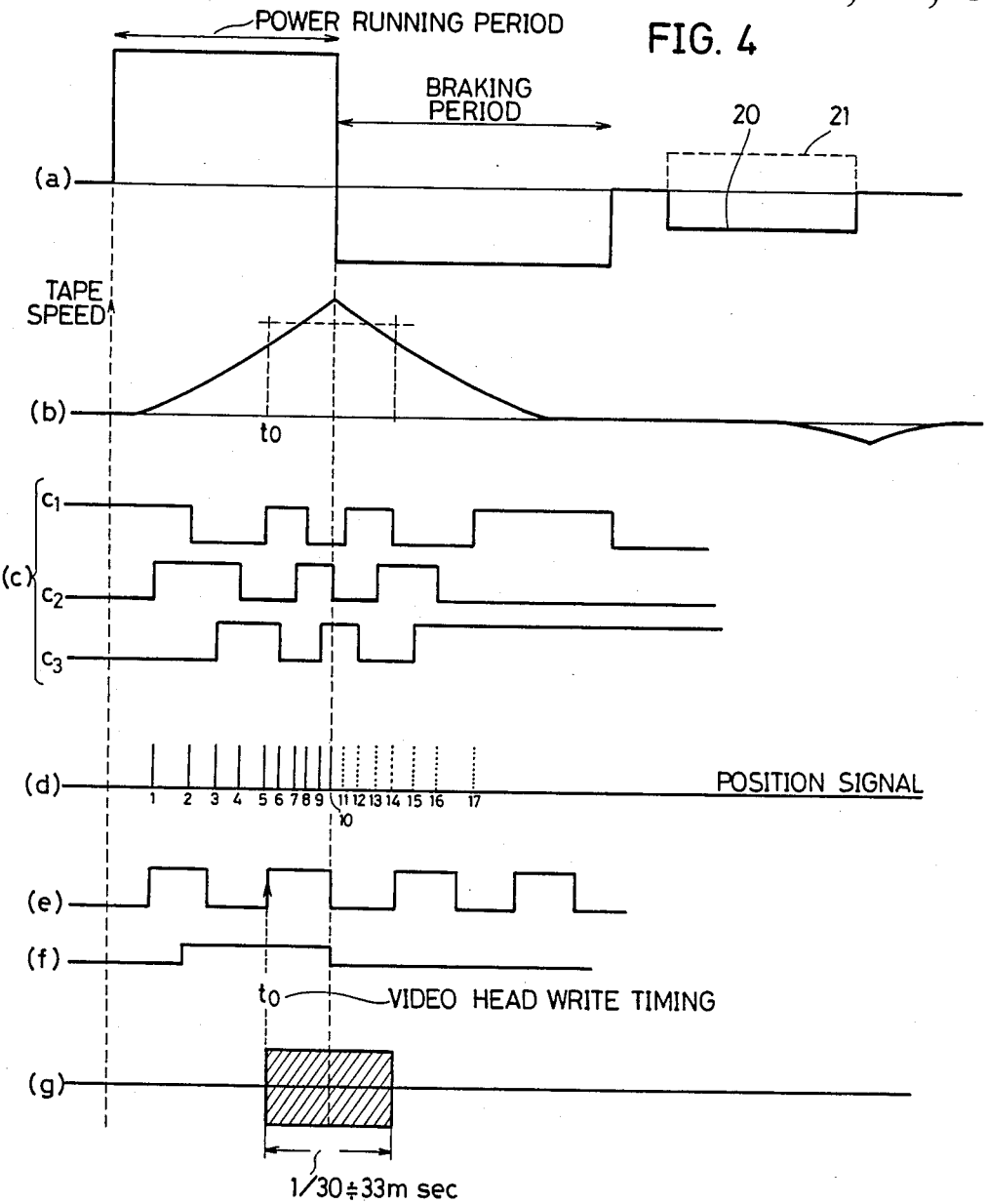
FIG. 4(a) through (g) is a waveform diagram for explaining the operation of the conventional apparatus in FIG. 1.

First, if the brake 13 works loosely and the load of the capstan 2 is decreased, the magnetic tape 1 does not stop at a desired position and overruns. As a result, the position signal provided from the position detector 12 unavoidably contains 17 or more pulses as shown in FIG. 7(d) (the desired number of pulses being 16). As a result, the error detector 6 detects an excess in the number of pulses of the position signal from the position detector 12 and the number exceeding the desired number of pulses and provides the detection output to the motor drive amount correction signal generating circuit 14. In consequence, the motor drive amount correction signal generating circuit 14 generates small reverse rotation pulse groups $t_1$, $t_2$, $t_3$, etc. with the pulse voltage being changed for each pulse group including 4 pulses, as shown in FIG. 4(a), after the end of the braking period defined by the feed amount setting circuit 4. Those reverse rotation pulses are applied to the motor drive circuit 7 to rotate the capstan motor 8 in the reverse direction. As a result, the magnetic tape 1 moves in the reverse direction so that the overrun is corrected.

Assuming that the magnetic tape 1 overruns in a manner in which the number of pulses of the position signal generated in one frame recording period P exceeds the desired number 16 only by one or two pulses, the overrun can be corrected only by using the above stated small reverse rotation pulse groups $t_1$, $t_2$, $t_3$, etc. However, if the brake 13 works more loosely, the number of pulses of the position signal generated in one frame recording period P exceeds the desired number 16 by 3 pulses or more (for example, 19 pulses are generated as in the position signal (d) in the period A shown in FIG. 7). In that case, the overrun can not be corrected only by the small reverse rotation pulse groups and in view of the intermittent cycle, those reverse rotation pulse groups $t_1$, $t_2$, $t_3$, etc. can not be generated continuously for a long period. In this case, as shown in the period A' in FIG. 7, control is made to change the braking voltage in the subsequent drive period (as shown by q2, q3, etc.) so that the difference of the number of pulses of the position signal from the desired number 16 may be 2 pulses or less. Within this range of 2 pulses or less, fine correction operation by the reverse rotation pulse groups $t_1$, $t_2$, etc. is repeated.

As described above, when the position error is small, fine correction is made only by the reverse rotation pulse groups $t_1$, $t_2$, $t_3$, etc. According to the amount of the position error, the motor drive amount correction signal generating circuit 14 changes the levels (the amplitude values) of the reverse rotation pulse groups $t_1$, $t_2$, $t_3$, etc. On the other hand, if the position error is large, correction is made to a large extent by changing the braking voltage in the subsequent drive period and then, fine correction is made in the subsequent drive period.

The motor drive amount correction signal generating circuit 14 is designed so that the amplitude values of the reverse rotation pulse groups, the number of pulses of each group, the number of steps and the changing range of the braking voltage may be suitable values according to the characteristics and specifications of the apparatus. However, excessively complicated variations may not be applied to the design if the brake pad material abrades only slightly over time.

In the foregoing, the operation in the case in which the brake works loosely was described. On the other hand, the operation in the case in which the brake works tightly is performed in the following manner. As shown in FIG. 8, fine correction is made by using forward rotation pulse groups $t_1'$, $t_2'$, $t_3'$, etc. (the polarity thereof being opposite to that of the reverse rotation pulse groups $t_1$, $t_2$, etc.) and if the error largely deviates from the region where fine correction can be applied (for example, the number of pulses of the position signal being 13 or less), the braking voltage in the subsequent drive period is decreased to $q_2'$, $q_3'$, etc. according to the number of pulses.

Figure 5:
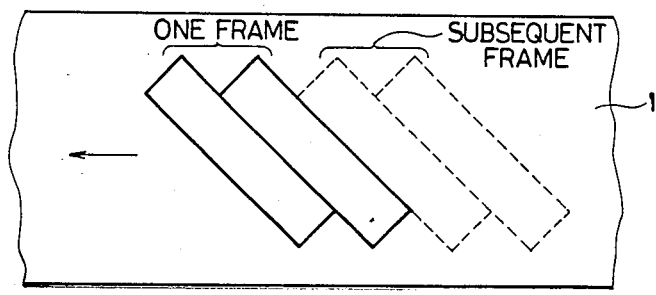
FIG. 5 is an illustration typically showing a record pattern of a magnetic tape where intermittent recording is done.

In such a structure as described above, the rotation amount of the capstan shaft 2 hardly changes and normal intermittent tape feeding operation is performed stably even if the state of the brake 13 or the load of the bearing or the like of the capstan shaft 2 is largely changed due to the change according to the passage of the time, or due to the temperature or the humidity. Accordingly, no blank or overlap is generated after the end of the recording of one frame and the subsequent frame can be recorded continuously without causing any blank or overlap. In other words, intermittent recording operation is performed stably and intermittent video data is recorded on the magnetic tape 1 in the same format (see FIG. 5) as in the case of continuous recording.

Figure 9:
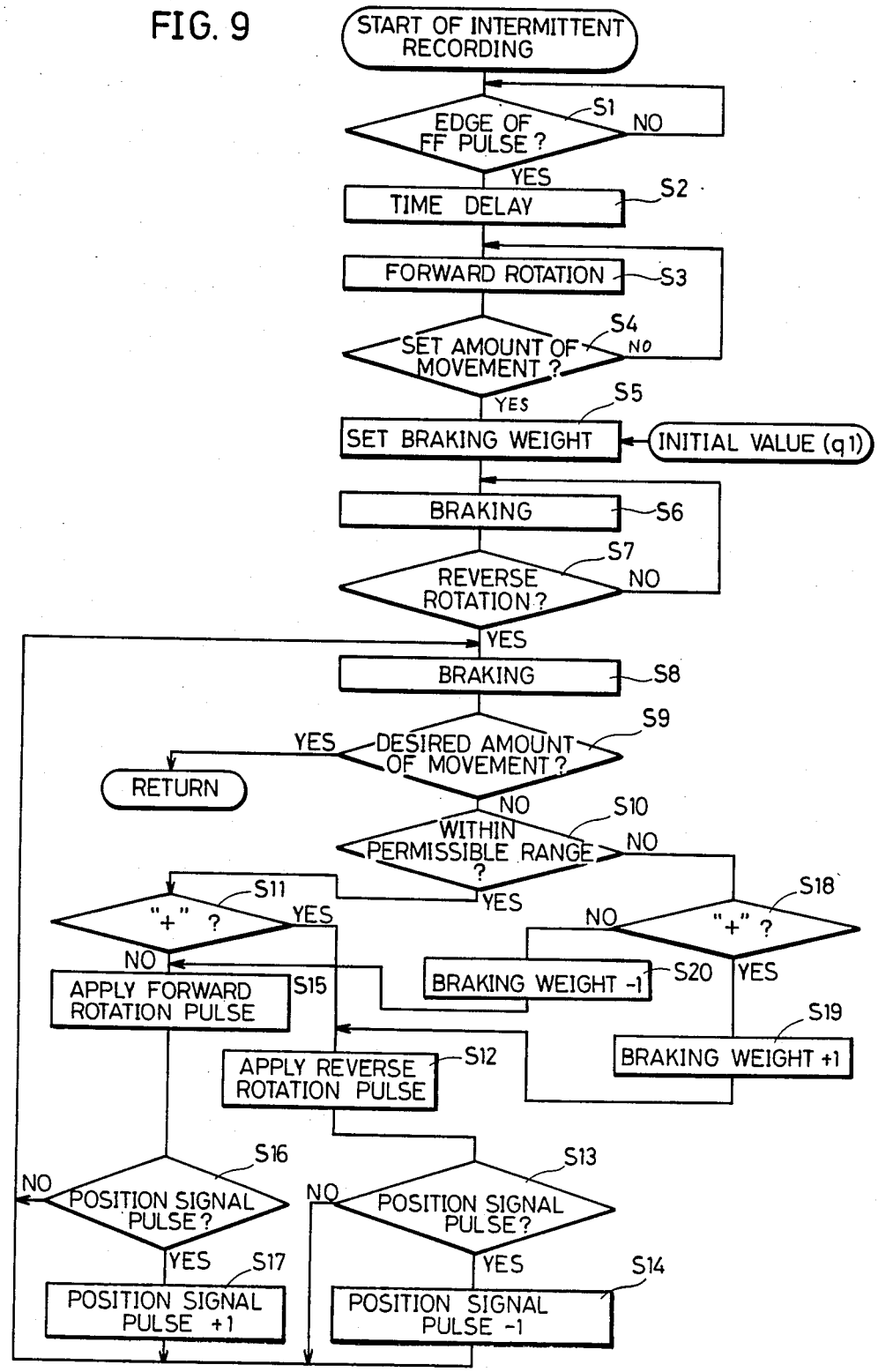
FIG. 9 is a flow chart for explaining the operation of the motor drive amount correction signal generating circuit shown in FIG. 6.

The motor drive amount correction signal generating circuit 14 is preferably formed by a microcomputer (of approximately 4 bits, for example). FIG. 9 is an operation flow chart in the case in which the motor drive amount correction signal generating circuit 14 is formed by a microcomputer. In the following, the operation shown in FIG. 9 will be briefly described.

First, in order to adjust the phases of the FF pulses shown in FIG. 7(e) or FIG. 8(e) and the video head writing pulse shown in FIG. 7(f) or FIG. 8(f) to the recording timing of the FM video signal shown in FIG. 7(g) or FIG. 8(g), the edge of the FF pulses is detected and a time delay is applied (in steps S1 and S2). After that, the capstan motor 8 is rotated in the forward direction in the power running period set by the feed amount setting circuit 4 (in steps S3 and S4). After the end of the power running period, the braking weight of the braking voltage to be applied to the capstan motor 8 is set to an initial value $q_1$ (in step S5). Then, the braking voltage is applied to the capstan motor 8 and the application of this braking voltage is continued until the capstan motor 8 rotates in the reverse direction (in steps S6 and S7). When the capstan motor 8 rotates in the reverse direction, mechanical braking by the brake 13 is applied (in step S8).

Subsequently, it is determined whether the number of pulses of the position signal generated in one frame recording period P is coincident with the desired number 16 (in step S9). If the coincidence is determined, the program returns to the main routine (not shown) for controlling the whole operation of the VTR. On the other hand, if there is no coincidence, it is determined whether the difference from the desired number of pulses is within a permissible range (for example, 2 pulses or less) (in step S10). If the difference is within the permissible range, it is determined whether the error detected as the difference in the number of pulses is the error on the positive side (the detected number of pulses being larger than the desired number of pulses) or the error on the negative side (the detected number of pulses being smaller than the desired number of pulses) (in step S11). In the case of the error on the positive side, reverse rotation pulse groups are applied to the motor drive circuit 7 because the magnetic tape 1 has overrun (in step S12). Accordingly, the capstan motor 8 rotates in the reverse direction so that the magnetic tape 1 is moved toward the backward direction. At this time, since a position signal pulse is obtained from the position detector 12 if the magnetic tape 1 moves by a prescribed distance, the position signal pulse is subtracted from the number of pulses of the already obtained position signal (in steps S13 and S14). On the other hand, in the case of the error on the negative side, which corresponds to the case in which the feed amount of the magnetic tape 1 is too small, forward rotation pulse groups are applied to the motor drive circuit 7 (in step S15). As a result, the capstan motor 8 rotates in the forward direction so that the magnetic tape 1 is moved toward the forward direction. Then, the position signal pulse obtained from the position detector 12 is added to the number of pulses of the already obtained position signal (in steps S16 and S17). When one correction operation by using reverse rotation pulse groups or forward rotation pulse groups is completed, the program returns again to the operation in step S8 and the above described correction operation is repeated until the moving amount of the magnetic tape 1 is coincident with the desired moving amount.

On the other hand, if the error is beyond the permissible range, it is determined whether the error is the error on the positive side or the error on the negative side (in step S18). In the case of the error on the positive side, the program proceeds to step S19, where the braking weight is incremented by one to increase the braking voltage generated from the motor drive circuit 7 in the subsequent drive period (as shown by $q_2$, $q_3$, etc.). In the case of the error on the negative side, the program proceeds to step S20, where the braking weight is decremented by one to decrease the braking voltage generated from the motor drive circuit 7 in the subsequent drive period (as shown by $q_2'$, $q_3'$, etc.). When the braking weight is changed in step S19 or S20, the program then proceeds to the correction routine using reverse rotation pulse groups or forward rotation pulse groups and thus, the position of the magnetic tape 1 is corrected in the same manner as described above.

Although in the above described embodiment, a magnetic tape was used as an example of a magnetic recording medium, a magnetic disc or a magnetic drum may be used as the magnetic recording medium.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An intermittent drive type magnetic recording apparatus for intermittently recording a data signal on a magnetic recording medium by intermittently running said magnetic recording medium, comprising:

feed amount setting means (4) for setting in advance an amount of one feed of said magnetic recording medium, intermittent drive signal generating means (5) for providing a run command signal and a brake command signal sequentially based on the feed amount set by said feed amount setting means, voltage generating means (7) for generating a driving voltage and a braking sequentially based on the output of said intermittent drive singnal generating means, intermittent running means (2, 3, 8, 9 and 10) for running said magnetic recording medium by said driving voltage applied from said voltage generating means and braking said magnetic recording medium by said braking voltage applied therefrom, feed amount detecting means (11 and 12) for detecting the real feed amount of said magnetic recording medium fed by said intermittent running means, error detecting means (6) for detecting an error as a difference between the feed amount set by said feed amount setting means and the feed amount detected by said feed amount detecting means, and brake torque changing means (14) for changing the brake torque of said intermittent running means based on the result of detection of said error detecting means, wherein said brake torque changing means comprises level changing means operable to generate a series of pulse groups and corresponding pulse voltages changeable for each pulse group for changing the level of the braking voltage generated from said voltage generating means and wherein said level changing means changes the level of said braking voltage to increase the brake torque of said intermittent running means when the feed amount set by said feed amount setting means is larger than the feed amount detected by said feed amount detecting means, and said level changing means changes the level of said braking voltage to decrease the brake torque of said intermittent running means when the feed amount set by said feed amount setting means is smaller than the feed amount detected by said feed amount detecting means.

2. An intermittent drive type magnetic recording apparatus in accordance with claim 1, wherein said level changing means changes the level of said braking voltage according to the error emount detected by said error detecting means.

3. An intermittent drive type magnetic recording apparatus for intermittently recording a data signal on a magnetic recording medium by intermittently running said magnetic recording medium, comprising:

feed amount setting means (4) for setting in advance an amount of one feed of said magnetic recording medium, intermittent drive signal generating means (5) for providing a run command signal and a brake command signal sequentially based on the feed amount set by said feed amount setting means, voltage generating means (7) for generating a driving voltage and a braking voltrage sequentially based on the output of said intermittent drive signal generating means, intermittent running means (2, 3, 8, 9 and 10) for running said magnetic recording medium by said driving voltage applied from said voltage generating means and braking said magnetic recording medium by said braking voltage applied therefrom, feed amount detecting means (11 and 12) for detecting the real feed amount of said magnetic recording medium fed by said intermittent running means, error detecting means (6) for detecting an error as a difference between the feed amount set by said feed amount setting means and the feed amount detected by said feed amount detecting means, and brake torque changing means (14) for changing the brake torque of said intermittent running means based on the result of detection of said error means, wherein said brake torque changing means comprises level changing means for changing the level of the braking voltage generated from said voltage generating means and wherein said level changing means changes the level of said braking voltage to increase the brake torque of said intermittent running means when the feed amount set by said feed amount setting means is larger then the feed amount detected by said feed amount detecting means, and said level changing means changes the level of said braking voltage to decrease the brake torque of said intermittent running means when the feed amount set by said feed amount setting means is smaller than the feed amount detected by said feed amount detecting means, wherein said level changing means changes the level of said braking voltage according to the error amount detected by said error detecting means wherein said level changing means comprises determining means for determining whether the error amount detected by said error detecting means is within a predetermined permissible range or not, and said level changing means changes the level of said braking voltage only when said determining means determines that said error amount is beyond said predetermined permissible range.

4. An intermittent drive type magnetic recording apparatus for intermittently recording a data signal on a magnetic recording medium by intermittently running said magnetic recording medium, comprising:

feed amount setting means (4) for setting in advance an amount of one feed of said magnetic recording medium, intermittent drive signal generating means (5) for providing a run command signal and a brake command signal sequentially based on the feed amount set by said feed amount setting means, voltage generating means (7) for generating a driving voltage and a braking voltage sequentially based on the output of said intermittent drive signal generating means, intermittent running means (2, 3, 8, 9 and 10) for running said magnetic recording medium by said driving voltage applied from said voltage generating means and braking said magnetic recording medium by said braking voltage, feed amount detecting means (11 and 12) for detecting the real feed amount of said magnetic recording medium fed by said intermittent running means, error detecting means (6) for detecting an error as a difference between the feed amount set by said feed amount setting means and the real feed amount detected by said feed amount detecting means, brake torque changing means (14) for changing the brake torque of said intermittent running mans in the subsequent recording period according to the result of detection of said error detecting means, and correction means (14) connected to the voltage generating means for correcting the feed amount of said magnetic recording medium according to the error amount detected by said error detecting means connected to the voltage generating means through said connection means, wherein said brake torque changing means is operable to generate a series of pulse groups and corresponding pulse voltages changable for each pulse group to thereby vary the brake torque as a function of the pulse voltage being said braking voltage.

5. An intermittent drive type magnetic recording apparatus in accordance with claim 4, wherein
said brake torque changing means comprises level changing means for changing the level of the braking voltage generated from said voltage generating means.

6. An intermittent drive type magnetic recording apparatus in accordance with claim 5, wherein
said level changing means changes the level of said braking voltage to increase the brake torque of said intermittent running means when the feed amount set by said feed amount setting means is larger than the feed amount detected by said feed amount detecting means, and
said level changing means changes the level of said braking voltage to decrease the brake torque of said intermittent running means when the feed amount set by said feed amount setting means is smaller than the feed amount detected by said feed amount detecting means.

7. An intermittent drive type magnetic recording apparatus in accordance with claim 6, wherein
said level changing means changes the level of said braking voltage according to the error amount detected by said error detecting means.

8. An intermittent drive type magnetic recording apparatus in accordance with claim 9, wherein
said level changing means comprises determining means for determining whether the error amount detected by said error detecting means is within a predetermined permissible range or not, and
said level changing means changes the level of said braking voltage only when said determining means determines that said error amount is beyond said predetermined permissible range.

9. An intermittent drive type magnetic, recording apparatus in accordance with claim 4, wherein
said correction means comprises correction voltage adding means for adding a correction voltage of an electric power amount according to said error amount after the application of said braking voltage.

10. An intermittent drive type magnetic recording apparatus in accordance with claim 9, wherein
said correction voltage adding means adds the correction voltage of a first polarity for moving said magnetic recording medium in the forward direction when the feed amount set by said feed amount setting means is larger than the feed amount detected by said intermittent feed amount detecting means, and
said correction voltage adding means adds the correction voltage of a second polarity for moving said magnetic recording medium in the backward direction when the feed amount set by said feed amount setting means is smaller than the feed amount detected by said feed amount detecting means.

* * * * *